United States Patent
Nakashima et al.

(10) Patent No.: US 8,003,262 B2
(45) Date of Patent: Aug. 23, 2011

(54) NONAQUEOUS ELECTROLYTE SOLUTION SECONDARY BATTERY SEPARATOR HAVING DEFINED RATIO OF AVERAGE PORE DIAMETER TO MAXIMUM PORE DIAMETER AND NONAQUEOUS ELECTROLYTE SOLUTION SECONDARY BATTERY USING THE SAME

(75) Inventors: Satoshi Nakashima, Ibaraki (JP); Yasushi Usami, Shiga (JP); Kazutaka Sasaki, Shiga (JP)

(73) Assignees: Mitsubishi Chemical Corporation, Tokyo (JP); Mitsubishi Plastics, Inc., Tokyo (JP)

( * ) Notice: Subject to any disclaimer, the term of this patent is extended or adjusted under 35 U.S.C. 154(b) by 1118 days.

(21) Appl. No.: 11/347,213

(22) Filed: Feb. 6, 2006

(65) Prior Publication Data

US 2006/0127753 A1    Jun. 15, 2006

Related U.S. Application Data

(63) Continuation of application No. PCT/JP2004/001466, filed on Feb. 12, 2004.

(30) Foreign Application Priority Data

Aug. 6, 2003  (JP) .................. 2003-287903
Aug. 6, 2003  (JP) .................. 2003-287904

(51) Int. Cl.
  *H01M 2/16*  (2006.01)
(52) U.S. Cl. ......... 429/251; 429/254; 429/129; 429/142
(58) Field of Classification Search .................. 429/142, 429/251, 254, 129
See application file for complete search history.

(56) References Cited

U.S. PATENT DOCUMENTS

| | | | |
|---|---|---|---|
| 4,994,335 A | 2/1991 | Kamaei et al. | |
| 5,173,235 A | 12/1992 | Kamei et al. | |
| 6,080,507 A | 6/2000 | Yu | |
| 2002/0148723 A1* | 10/2002 | Takata et al. | 204/252 |

FOREIGN PATENT DOCUMENTS

| | | |
|---|---|---|
| CN | 1298209 | 6/2001 |
| EP | 0 547 237 | 6/1993 |
| EP | 1168469 | 1/2002 |
| JP | 2-88649 | 3/1990 |
| JP | 3-241660 | 10/1991 |
| JP | 4-212264 | 8/1992 |
| JP | 4-212265 | 8/1992 |
| JP | 7-272762 | 10/1995 |
| JP | 8-255615 | 10/1996 |
| JP | 10-50287 | 2/1998 |
| JP | 10-316795 | 12/1998 |
| JP | 11-185723 | 7/1999 |
| JP | 11-329390 | 11/1999 |
| JP | 2000-195485 | 7/2000 |
| JP | 2002-88188 | 3/2002 |
| JP | 2002-128928 | 5/2002 |
| JP | 2002-201298 | 7/2002 |
| WO | WO 98/59384 | 12/1998 |
| WO | WO 9859384 A1 * | 12/1998 |
| WO | WO 02061872 A1 * | 8/2002 |

OTHER PUBLICATIONS

English Translation of JP 2002-088188, Mar. 2002 (Japanese reference supplied in applicant's IDS dated Feb. 6, 2006).*
English Translation of JP 2002-128928, May 2002 (Japanese reference supplied in applicant's IDS dated Feb. 6, 2006).*

* cited by examiner

*Primary Examiner* — Barbara L Gilliam
*Assistant Examiner* — Zachary Best
(74) *Attorney, Agent, or Firm* — Oblon, Spivak, McClelland, Maier & Neustadt, L.L.P.

(57) ABSTRACT

An object of this invention is to improve battery performance such as a rate capability of a nonaqueous electrolyte solution secondary battery using a separator constituting a thermoplastic resin-based porous film containing a filler.

This invention provides a nonaqueous electrolyte solution secondary battery separator which is formed from a porous film containing a thermoplastic resin and a filler contained in the thermoplastic resin and has a ratio of an average pore diameter (μm) to a maximum pore diameter (μm) defined by ASTM F316-86 of 0.6 or more as well as relates to a nonaqueous electrolyte solution secondary battery using this separator.

22 Claims, No Drawings

NONAQUEOUS ELECTROLYTE SOLUTION SECONDARY BATTERY SEPARATOR HAVING DEFINED RATIO OF AVERAGE PORE DIAMETER TO MAXIMUM PORE DIAMETER AND NONAQUEOUS ELECTROLYTE SOLUTION SECONDARY BATTERY USING THE SAME

CROSS-REFERENCE TO A RELATED APPLICATION

The present application is a continuation of International Application PCT/JP04/001466, filed Feb. 12, 2004, which claims priority to Japanese Patent Applications Nos. 2003-287903 and 2003-287904, both filed Aug. 6, 2003.

FIELD OF THE INVENTION

The present invention relates to a nonaqueous electrolyte solution secondary battery separator and a nonaqueous electrolyte solution secondary battery using the same.

More specifically, this invention relates to a nonaqueous electrolyte solution secondary battery separator realizing a secondary battery which is hardly reduced in discharge efficiency during high rate discharge and excellent in battery performance as well as to a nonaqueous electrolyte solution secondary battery using the separator.

Further, this invention provides a nonaqueous electrolyte solution secondary battery separator which suppresses formation of minute short circuit and corrosion of a current collector caused due to specific impurities contained in the separator containing an inorganic filler by reducing the impurities and realizes a secondary battery excellent in battery performance such as cyclability as well as a nonaqueous electrolyte solution secondary battery using the separator.

BACKGROUND ART

Due to weight saving and downsizing of electronic appliances, lithium secondary battery which is nonaqueous electrolyte solution secondary battery having a high energy density and light weight have been used in a wide range of fields. The lithium secondary battery consists mainly of a positive electrode obtained by forming an active material layer containing a positive electrode active material such as a lithium compound whose representative example is lithium cobalt oxide on a current collector; a negative electrode obtained by forming an active material layer containing a negative electrode active material such as a carbon material whose representative example is graphite capable of insertion and extraction of lithium on a current collector; a nonaqueous electrolyte solution generally obtained by dissolving an electrolyte such as a lithium salt including $LiPF_6$ into an aprotic nonaqueous solvent; and a separator formed from a porous film.

The separator used in the lithium secondary battery must meet the requirements of not preventing ionic conduction between the electrodes, retaining the electrolyte solution, having solvent resistance to the electrolyte solution, and the like, and a porous film formed from a thermoplastic resin such as polyethylene and polypropylene is mainly used for the separator.

As a method for producing the porous film, the following methods, for example, have heretofore been known in the art.

(1) An extraction method of achieving a desired porosity by molding a polymer material by adding thereto a plasticizer which can readily be extracted and removed by downstream processing and then removing the plasticizer by the use of an appropriate solvent.

(2) A drawing method of molding a crystalline polymer material and then forming pores by selectively drawing an amorphous region which is structurally weak.

(3) An interface separation method of molding a polymer material by adding thereto a filler and then forming pores by separating an interface between the polymer and the filler through drawing operation.

Since the extraction method (1) requires processing of a large amount of waste fluid, the method has drawbacks in terms of environment and economy as the method for obtaining the thermoplastic resin-based porous film. Also, since it is difficult to obtain a uniform film due to shrinkage of the film caused in the extraction process, the method has a drawback in terms of productivity such as yield. Since the drawing method (2) requires long time thermal processing in order to control a pore diameter distribution by way of control on structures of a crystalline phase and an amorphous phase before drawing, the method has a drawback in terms of the productivity.

As an improved technology of the method (1), JP-A-6-240036 discloses a method of obtaining a polyolefin porous film having a sharp pore diameter distribution (maximum pore diameter/average penetration pore diameter: 1.5 or less) by subjecting to drawing and solvent removal operations at specific temperature a gel sheet obtained by extruding a polyolefin solution containing an ultrahigh molecular weight component and having a large molecular weight distribution followed by quenching.

However, this method is increased in the number of process steps since it is necessary to perform two drawing operations different in temperature for the purposes of forming pores of a uniform size and enlarging the size to a practically suitable one, and, therefore, the method is complicated in process as compared with an ordinary extraction method and has a drawback in terms of productivity. Also, due to the two drawing steps, drawing ununiformity can be caused in each of the steps. Further, since the method substantially is an extraction method, the method requires processing of a large amount of waste fluid as mentioned above to pose a drawback in terms of environment and economy. Also, since it is difficult to obtain a uniform film due to shrinkage of the film during the extraction process, the method has a drawback in terms of productivity such as yield.

In contract, the interface separation method (3) is free from the waste fluid and excellent in terms of environment and economy. Also, since the interface between the polymer material and the filler can be separated easily by the drawing operation, the method makes it possible to obtain a porous film without performing a pretreatment such as a heat treatment and is excellent in terms of productivity. For example, JP-A-2002-201298 discloses a porous film formed from a thermoplastic resin and a filler and having a value of $X_R$ of less than 5 when $X_R$ is defined by $X_R = 25 \times T_{GUR} \times d^2 \div Y$ [wherein Y is a thickness (μm); $T_{GUR}$ is a Gurley value (Gurley air permeability) (second/100 cc); d is an average pore diameter (μm)].

[Patent Literature 1] JP-A-6-240036
[Patent Literature 2] JP-A-2002-201298

DISCLOSURE OF THE INVENTION

However, though attention has heretofore been paid to the average particle diameter of the filler blended for achieving the desired porosity as disclosed in JP-A-2002-201298, interest in the particle size distribution of the filler has not been expressed in the conventional interface separation methods. Accordingly, a filler having a large proportion of large size particles has been used to deteriorate continuity of the pores for the reasons explained later in this specification, thereby failing to obtain a separator having desired properties. For instance, as disclosed in Example 1 of JP-A-2002-201298, the maximum battery rate capability obtained by the discharge capacity of 4C to the discharge capacity at the discharge speed of C/3 was only about 40%.

Further, in the case of using the porous film obtained by the interface separation method as a separator of a secondary battery, battery performance, particularly a cyclability at high temperatures, tends to be deteriorated.

Therefore, an object of the present invention is to realize a nonaqueous electrolyte solution secondary battery excellent in battery performance such as a rate capability even when a separator formed from a filler-containing thermoplastic resin-based porous film by an interface separation method excellent in terms of environment, economy, and productivity is used for the nonaqueous electrolyte solution secondary battery. Another object of this invention is to realize a nonaqueous electrolyte solution secondary battery excellent in cyclability.

The nonaqueous electrolyte solution secondary battery separator of this invention is formed from a porous film comprising a thermoplastic resin and a filler contained in the thermoplastic resin, the nonaqueous electrolyte solution secondary battery separator being characterized in that a ratio $d_{ave}/d_{max}$ of an average pore diameter $d_{ave}$ (μm) to a maximum pore diameter $d_{max}$ (μm) is 0.6 or more.

The nonaqueous electrolyte solution secondary battery of this invention comprises a positive electrode capable of inserting and extracting lithium ions; a negative electrode capable of inserting and extracting lithium ions; an electrolyte solution comprising a nonaqueous solution and an electrolyte contained in the nonaqueous solution; and a separator, the nonaqueous electrolyte solution secondary battery being characterized by using the above-described separator of this invention.

The inventors have conducted extensive researches on the control on filler characteristics and film properties of a thermoplastic resin-based porous film containing the filler and found that a use of a filler which has not been used industrially and has a specific particle diameter distribution makes it possible to realize a thermoplastic resin-based porous film having a remarkably uniform pore diameter and excellent battery performance, particularly an improved rate capability, as a separator for a nonaqueous electrolyte solution secondary battery, thereby accomplishing this invention.

The reasons why the nonaqueous electrolyte solution secondary battery excellent in rate capability can be obtained by using the nonaqueous electrolyte solution secondary battery separator of this invention are considered as follows.

In the interface separation method, the particle diameter distribution of the filler has a considerably great influence on a film structure since a porous structure is formed by separating interfaces of the base resin and the filler by drawing operation. For instance, the total number of particles of a filler having a wider particle diameter distribution is smaller than that of a filler having a narrower particle diameter distribution even when the fillers are identical in average particle diameter since particles having a relatively large particle diameter are contained in the filler of the wider particle diameter distribution. The reduction in total number of particles means a reduction in number of starting points for creating pores in the drawing operation and is considered to increase resistance against ionic conductivity due to a reduction in continuity of pores. The control on the particle diameter distribution of the filler can be achieved by way of selection among forms of the filler in the interface separation method, and such control on the particle diameter distribution is industrially advantageous since the control method makes it easy for person skilled in the art to control a porous structure which is considerably sensitive to the battery performance.

For example, this invention realizes a separator having a uniform pore diameter by controlling the particle diameter distribution of the filler, thereby preventing an increase in resistance against ionic conductivity, which is otherwise caused by the insufficient number of starting points for pore creation, to improve nonuniformity of the ionic conductivity resistance and realizing a nonaqueous electrolytic secondary battery excellent in rate capability which enables a discharge capacity at a discharge speed of 6C to a discharge capacity at a discharge speed of C/3 to be 60% or more.

Also, in view of the fact that an inorganic filler is left as it is in a polymer porous film obtained by the interface separation method, the inventors have conducted extensive researches on influences of impurities contained in the inorganic filler. As a result of the researches, the inventors have found that it is possible to further suppress the reduction in cyclability at high temperatures by suppressing amounts of specific impurities to be contained in the separator to predetermined values.

More specifically, as shown in Examples 8 and 9 described later in this specification, many of inorganic fillers which are industrially produced to be used in the conventional interface separation methods contain impurities such as halogen elements and iron elements because they are prepared by using naturally quarried rocks as raw materials, and, because of the raw materials, the polymer porous films produced by the conventional interface separation methods contain the halogen elements and the iron elements as the impurities. The inventors have noted the impurity elements contained in the inorganic filler to be inevitably contained in the separator and studied the influences of the inclusion of the impurity elements in the separator to find that it is possible to further suppress the reduction in cyclability at high temperatures by suppressing amounts of the impurities, particularly amounts of the halogen elements and the iron elements among the impurities, to predetermined values.

Details of mechanism of the influences of the halogen elements and the iron elements contained in the separator have not been clarified, but it is considered that the iron elements tend to cause a reduction in charge and discharge efficiencies and cyclability deterioration since a minute short circuit is formed when Fe is eluted from the separator to the electrolyte solution to be deposited on a surface of the negative electrode. Also, when the halogen elements are eluted from the separator to the electrolyte solution, corrosions of a package of the battery and the current collector are promoted to cause deterioration in battery performance.

As is apparent from the results of Examples and Comparative Examples described later in this specification, this invention provides a nonaqueous electrolyte solution secondary battery which is excellent in battery performance, particularly in rate capability, and has stable performance by the use of a nonaqueous electrolyte solution secondary battery separator which comprises a thermoplastic resin-based porous film containing a filler and has a uniform pore diameter. Also, since the nonaqueous electrolyte solution secondary battery separator of this invention is reduced in contents of halogen elements and iron elements, it is possible to provide a nonaqueous electrolyte solution secondary battery further improved in battery performance, particularly in cyclability at high temperatures.

BEST MODE FOR CARRYING OUT THE INVENTION

Hereinafter, embodiments of this invention will be described in detail.
(Pore Diameter of Separator of the Invention)

The nonaqueous electrolyte solution secondary battery separator of this invention is formed from a porous film containing a thermoplastic resin and a filler contained in the thermoplastic resin and has a ratio $d_{ave}/d_{max}$ of an average pore diameter $d_{ave}$ (μm) to a maximum pore diameter $d_{max}$ (μm) defined by ASTM F316-86 of 0.6 or more. The average pore diameter and the maximum pore diameter according to this invention are defined by ASTM F316-86.

The average pore diameter of the separator of this invention, i.e., a lower limit of the average pore diameter $d_{ave}$ of the porous film constituting the separator may usually be 0.03 μm or more, preferably 0.05 μm or more, more preferably 0.1 μm or more, particularly preferably 0.5 μm or more, and an upper limit of the average pore diameter $d_{ave}$ may usually be 5 μm or less, preferably 3 μm or less, more preferably 2 μm or less. When the average pore diameter $d_{ave}$ is less than 0.03 μm, it is difficult to achieve continuity among pores formed by the interface separation, and clogging due to a byproduct of a reaction inside a battery tends to occur, thereby increasing an electronic resistance to reduce rate capability of a secondary battery to be obtained. When the average pore diameter $d_{ave}$ exceeds 5 μm, a byproduct of a reaction inside a battery tends to immigrate to promote deterioration of an electrode active material, thereby reducing a cyclability or the like of a secondary battery to be obtained.

A ratio of the average pore diameter to the maximum pore diameter of the separator of this invention, i.e. the value of the average pore diameter $d_{ave}$/maximum pore diameter $d_{max}$ of the porous film constituting the separator of this invention, is 0.6 or more. The ratio $d_{ave}/d_{max}$ may preferably be 0.65 or more, more preferably 0.7 or more. When the ratio $d_{ave}/d_{max}$ is less than 0.6, irregularity in pore diameter of the separator is increased to undesirably reduce battery performance such as the rate capability and the like.

The ratio $d_{ave}/d_{max}$ may desirably be of the larger value because the irregularity in pore diameter of the separator is reduced, particularly a proportion of larger pore diameters is reduced, with an increase in the ratio $d_{ave}/d_{max}$, but it is sufficient when the upper limit of the ratio $d_{ave}/d_{max}$ is about 0.95.
(Constitution and Physical Properties of Separator of the Invention)

The thermoplastic resin which is a base resin of the porous film constituting the separator of this invention is not particularly limited so far as a filler can be dispersed therein uniformly, and examples of such thermoplastic resin include a polyolefin resin, a fluorine resin and a styrene-based resin such as a polystyrene resin, an ABS resin, a vinyl chloride resin, a vinylacetate resin, an acryl resin, a polyamide resin, an acetal resin, a polycarbonate resin, and the like. Among the above thermoplastic resins, the polyolefin resin is particularly preferred because it is excellent in balance among heat resistance, solvent resistance, and flexibility. Examples of the polyolefin resin include a polyolefin resin containing as a main component a monoolefin polymer such as ethylene, propylene, 1-butene, 1-hexene, 1-octane, and 1-decene; and a polyolefin resin containing as a main component a copolymer obtained from ethylene, propylene, 1-butene, 1-hexene, 1-octane, or 1-decene and another monomer such as 4-methyl-1-pentene and vinyl acetate, and specific examples of the polyolefin resin include low density polyethylene, linear low density polyethylene, high density polyethylene, polypropylene, crystalline ethylene-propylene block copolymer, polybutene, ethylene-vinyl acetate copolymer, and the like. In this invention, it is preferable to use the high density polyethylene or polypropylene among the above polyolefin resins. The above polyolefin resins may be used alone or in combination of 2 or more.

A lower limit of a weight average molecular weight of the thermoplastic resin may usually be 50,000 or more, particularly 100,000 or more, and an upper limit of the weight average molecular weight of the thermoplastic resin may usually be 500,000 or less, preferably 400,000 or less, more preferably 300,000 or less, particularly 200,000 or less. When the upper limit exceeds the above value, a melt viscosity of the resin is increased, and it is difficult to perform melt-molding because of the increased melt viscosity in addition to a reduction in fluidity caused by addition of the filler. Further, even if a mold product is obtained, the filler is not dispersed in the resin uniformly to undesirably result in nonuniform pore formation by the interface separation. When the lower limit exceeds the above value, mechanical strength is undesirably reduced.

The filler to be contained in the porous film of this invention is a factor deciding a pore diameter distribution of the separator of this invention, and it is important to control a particle size distribution of the filler. The filler to be used in this invention is not limited so far as it satisfies the above conditions and can be used alone or in combination of 2 or more.

Types of the filler are not particularly limited, but it is preferable to use an inorganic filler because the inorganic filler hardly reacts with an electrolyte solution and less subject to oxidation/reduction. Among others, the inorganic filler which has a characteristic of not decomposing a carbonate-based organic electrolyte solution used for a lithium secondary battery may be preferred. Examples of such filler include hardly soluble sulfate, alumina, and the like, and barium sulfate and alumina may suitably be used. Particularly, barium sulfate may suitably be used. As used herein, "hardly soluble" means that a solubility to 25° C. of water is 5 mg/l or less.

Carbonate such as calcium carbonate, titanium oxide, silica, and so forth usually used as a filler are not preferred because they incur decomposition of a nonaqueous electrolyte solution component of a lithium secondary battery as described below. As used herein, "decomposition of organic electrolyte solution component" is defined that a concentration of lithium ions in an electrolyte solution which is a 1M $LiPF_6$ mixture nonaqueous solvent solution [EC/EMC=3:7 (volumetric ratio)] is reduced to 0.75 mmol/g or less after adding to the electrolyte solution the filler in an amount of 0.5 g per 1 ml of the electrolyte solution and retaining the electrolyte solution mixed with the filler at 85° C. for 72 hours. The amount of the lithium ions is measured by ion chromatography. It is necessary to keep the electrolyte solution in a sealed container so as to prevent the electrolyte solution from contacting the air during the 72 hours of retention because the decomposition of the electrolyte solution component can be promoted by a reaction with moisture in the air.

Results obtained by adding each of the following fillers to the electrolyte solution [1M $LiPF_6$/(EC+EMC) (3:7, contents ratio)] and retaining the electrolyte solutions under the above-described conditions are shown in a table below. As compared with an ionic composition of the electrolyte solution to which no filler was added, barium sulfate and alumina slightly change in composition, thereby revealing that they are suitable as the filler in this invention. In contrast, carbonates such as calcium carbonate and lithium carbonate or silica and titanium oxide cause a remarkable reduction in lithium ion and an increase in fluorine ion due to generation of hydrofluoric acid, thereby revealing that they are not suitable as the filler in this invention.

TABLE 1

| | | | Componential Analysis Value | | | |
|---|---|---|---|---|---|---|
| | | | Li (mmol/g) | $PF_6$ (mmol/g) | F (mmol/g) | $PO_2F_2$ (mmol/g) |
| Blank (electrolyte solution to which no inorganic filler is added) | | | 0.82 | 0.82 | 0.01 | <0.01 |
| Electrolyte solution to which Inorganic Filler is Added | Type of Inorganic Filler | $BaSo_4$ | 0.81 | 0.81 | 0.03 | 0.03 |
| | | $Al_2O_3$ | 0.82 | 0.82 | 0.01 | <0.01 |
| | | $CaCO_3$ | 0.48 | 0.01 | 1.6 | 0.59 |
| | | $Li_2CO_3$ | 0.24 | 0.00 | 0.01 | 0.35 |
| | | $SiO_2$ | 0.30 | 0.01 | 0.15 | 0.49 |
| | | $TiO_2$ | 0.68 | 0.66 | 0.45 | 0.07 |

A particle diameter of the filler is such that a lower limit of a number average particle diameter may usually be 0.01 μm or more, preferably 0.1 μm or more, particularly 0.2 μm or more and an upper limit of the number average particle diameter may usually be 2 μm or less, preferably 1.5 μm or less, particularly 1 μm or less. When the number average particle diameter of the filler exceeds 2 μm, a diameter of pores to be formed by drawing become too large to cause a rupture by drawing and a reduction in film strength. Also, when the number average particle diameter is less than 0.01 μm, the filler tends to be condensed to make it difficult to disperse the filler uniformly in the base resin.

In this invention, it is possible to use the inorganic fillers satisfying the above-described conditions alone or in combination of 2 or more.

A content of the filler in the porous film according to this invention is such that a lower limit thereof is usually 40 parts by weight or more, preferably 50 parts by weight or more, particularly 60 parts by weight or more, more preferably 100 parts by weight or more to 100 parts by weight of the thermoplastic resin and an upper limit thereof is usually 300 parts by weight or less, preferably 200 parts by weight or less, more preferably 150 parts by weight or less to 100 parts by weight of the thermoplastic resin. When the content of the filler is less than 40 parts by weight to 100 parts by weight of the thermoplastic resin in the porous film, it is difficult to form continued pores to make it difficult for a separator to achieve its function. When the content exceeds 300 parts by weight, a viscosity during the film formation is increased not only to deteriorate processability but also to cause a film rupture in drawing operation. In this invention, since the filler blended for producing the porous film substantially remains in the molded porous film, the range of the contents of the filler is a range of amounts of the filler contained in the porous film.

Also, the number of blended filler particles decides the number of pores formed in the porous film, and the blended filler particle number per 1 $cm^3$ of a resin is such that a lower limit thereof may usually be $1 \times 10^{11}$ or more, preferably $3 \times 10^{11}$, more preferably $5 \times 10^{11}$ and an upper limit thereof may usually be $1 \times 10^{14}$ or less, preferably $7 \times 10^{13}$ or less. When the blended filler particle number exceeds the upper limit, the number of pores to be formed becomes too large to cause immigration of a byproduct of a reaction inside a battery, thereby promoting deterioration in electrode active material and reducing a cyclability of a secondary battery to be obtained. When the blended filler particle number is below the lower limit, it is difficult to achieve continuity among pores to be formed, resulting in increase in electric resistance and reduction in rate capability of a secondary battery to be obtained.

In addition, a filler which is treated with a surface treatment agent so as to increase dispersibility in the thermoplastic resin can be used in this invention. Examples of the surface treatment include treatment using aliphatic acid such as stearic acid, a metal salt of aliphatic acid, polysiloxane, and a silane coupling agent in the case where the thermoplastic resin is the polyolefin resin.

In the molding of the porous film of this invention, a low molecular weight compound having a miscibility with the thermoplastic resin may be added. The low molecular weight compound penetrates between molecules of the thermoplastic resin to reduce interaction between the molecules and to inhibit crystallization, resulting in improvement in drawability of the resin composition at the time of sheet molding. The low molecular weight compound appropriately increases a interface adhesive force between the thermoplastic resin and the filler to prevent enlargement of pores otherwise caused by drawing and increases the interface adhesive force between the thermoplastic resin and the filler to prevent the filler from being detached from the film.

The low molecular weight compound to be suitably used has a molecular weight of 200 to 3,000, preferably 200 to 1,000. When the molecular weight of the low molecular weight compound exceeds 3,000, it is difficult for the low molecular weight compound to penetrate between molecules of the thermoplastic resin, thereby making the effect of improving drawability insufficient. When the molecular weight is less than 200, the low molecular weight compound is deposited on a surface of the porous film to cause a so-called blooming, deterioration in film property, and blocking though the miscibility is increased.

As the low molecular weight compound, aliphatic hydrocarbon or glyceride may preferably be used when the thermoplastic resin is the polyolefin resin. Particularly, when the polyolefin resin is polyethylene, liquid paraffin or a low melting point wax may preferably be used.

A content of the low molecular weight compound in the resin composition as a material for forming the porous film is such that a lower limit thereof may usually be 1 part by weight or more, preferably 5 parts by weight or more, to 100 parts by weight of the thermoplastic resin and an upper limit thereof may usually be 20 parts by weight or less, preferably 15 parts by weight or less, to 100 parts by weight of the thermoplastic resin.

When the content of the low molecular weight compound is less than 1 part by weight to 100 parts by weight of the thermoplastic resin, the above-described effects which should be achieved by the addition of the low molecular weight compound will be insufficient. When the content exceeds 20 parts by weight, the interaction between molecules of the thermoplastic resin is excessively lowered to make it impossible to achieve sufficient strength. Further, fuming and slipping on a screw portion can be caused during the sheet molding to make it difficult to stably perform the sheet molding.

Another additive such as a thermal stabilizer can be added to the resin composition as the material for forming the porous film of this invention when so required. Known additives can be used in this invention without particular limitations. A content of the additive is usually 0.05 to 1 wt % to a total weight of the resin composition.

A porosity of the porous film of this invention is such that a lower limit of a porosity of the porous film may usually be 30% or more, preferably 40% or more, more preferably 50% or more and an upper limit of the porosity may usually be 80% or less, preferably 70% or less, more preferably 65% or less, particularly preferably 60% or less.

When the porosity is less than 30%, ion conduction becomes insufficient to undesirably prevent the separator function. When the porosity exceeds 80%, actual strength of a film is reduced to undesirably cause a rupture during battery manufacture and shooting and a short-circuiting due to an active material.

Note that the porosity of the porous film is a value obtainable by the following calculating formula:

$$\text{Porosity } Pv\ (\%) = 100 \times (1 - w/[\rho \cdot S \cdot t])$$

S: area of porous film
t: thickness of porous film
w: weight of porous film
$\rho$: absolute specific gravity of porous film The absolute specific gravity is obtained from the following calculating formula when a blended weight and a specific gravity of a component i (resin, filler, or the like) constituting the polymer porous film is Wi and $\rho i$. In the formula, $\Sigma$ is a sum of all the ingredients.

$$\text{Absolute specific gravity } \rho \text{ of porous film} = \Sigma Wi/\Sigma(Wi/\rho i)$$

An upper limit of a thickness of the porous film of this invention may usually be 100 μm or less, particularly 50 μm or less, preferably 40 μm or less, and a lower limit thereof may usually be 5 μm or more, preferably 10 μm or more. When the thickness is less than 5 μm, the actual strength becomes insufficient to undesirably cause a rupture during battery manufacture and shooting and a short-circuiting due to an active material. When the thickness exceeds 100 μm, a separator is increased in electric resistance to undesirably reduce a capacity of a battery. It is possible to obtain a separator having good ion conduction by keeping the thickness in the range of 5 to 100 μm.

The porous film according to this invention may preferably have a lower limit of a Gurley air permeability of 20 seconds/100 cc or more, particularly 100 seconds/100 cc or more and an upper limit of 500 seconds/100 cc or less, particularly 300 seconds/100 cc or less. When the Gurley air permeability is below the lower limit, the porosity tends to be too high or the thickness tends to be too low, thereby reducing the actual strength of the film as described above to undesirably cause a rupture during battery manufacture and shooting and a short-circuiting due to an active material. When the Gurley air permeability exceeds the upper limit, the ion conduction becomes insufficient to undesirably prevent the separator function. The Gurley air permeability is measured in accordance with JIS P8117 and indicates time (seconds) required for 100 cc of the air to permeate through the film under a pressure of 1.22 kPa.

(Separator Production Process)

Hereinafter, a process for producing the separator of this invention will be described after explaining a general separator production process using a thermoplastic resin-based porous film containing a filler.

(General Separator Production Process)

The process for producing the thermoplastic resin-based porous film containing a filler is not particularly limited, and an extraction method (1), a drawing method (2), and an interface separation method (3) as described below can be used. Among the methods, the most preferable method is the interface separation method.

(1) Extraction method: A resin composition obtained by mixing a polymer material, a filler, and a plasticizer which can be removed by solvent extraction in a post-treatment is melted and then molded by a molding method such as extrusion to be in the form of a film. After that, the film is treated with a solvent to remove the plasticizer to obtain a porous film.

(2) Drawing method: A resin composition obtained by mixing a crystalline polymer material and a filler is melted and then molded by a molding method such as extrusion to be in the form of a film. The film is drawn to cut an amorphous region which is structurally weak to form micropores.

(3) Interface separation method: A resin composition obtained by mixing a polymer material and a filler is melted and then molded by a molding method such as extrusion to be in the form of a film. After that, the film is drawn to separate interfaces of the polymer material and the filler, thereby forming micropores.

Among the above production processes, the extraction method has a difficulty in letting the polymer material selectively contain the filler in the molding, and the filler contained in the plasticizer is removed together with the plasticizer at the extraction. Therefore, the extraction method is not efficient as compared with the interface separation method. Also, with the drawing method, pores are formed by the drawing in regions other than the amorphous region, namely in the interface between the polymer material and the filler, when the polymer material contains the filler. Thus, the drawing method is substantially the same as the interface separation method. Therefore, it is preferable to employ the interface separation method in this invention.

More specifically, the following method is employed for the formation of the porous film.

The filler, the thermoplastic resin, and the additive (the low molecular weight compound and the antioxidant which are added when so required) each of which is in a predetermined amount are mixed and melt-kneaded to prepare a resin composition. The resin composition may be subjected to a preliminary mixing using a Henschel mixer or the like before being prepared by using a single screw extruder, a twin screw extruder, a mixing roller, or a biaxial kneader, or the preliminary mixing may be omitted to directly prepare the resin composition by using any of the above extruders or the like.

Then, the resin composition is molded to be in the form of a sheet. The sheet formation is performed by employing a T-die method using a T-die or an inflation method using a circular die.

Then, the thus-obtained sheet is drawn. The drawing operation is performed by employing an MD uniaxial drawing method wherein the sheet is drawn in the direction (MD) along which the sheet is collected, a TD uniaxial drawing method wherein the sheet is drawn in the transverse direction (TD) using a tenter drawing machine or the like, a sequential biaxial drawing method wherein the sheet is uniaxially drawn in the MD and then in the TD by using a tenter drawing machine or the like, or a simultaneous biaxial drawing method wherein the sheet is drawn in both the machine and the transverse directions simultaneously. A roll drawing can be performed as the uniaxial drawing. The drawing operation can be performed at an arbitrary temperature so far as the temperature enables the resin composition constituting the sheet to be readily drawn at a predetermined draw ratio and does not cause the resin composition to be melted to close the pores and to reduce the continuity, and the temperature for the drawing may preferably be in such a temperature range from a temperature of 70° C. lower than a melting point of a resin to a temperature of 5° C. higher than a melting point of a resin. The drawing ratio is set arbitrarily in accordance with a required pore diameter or a required strength, and the drawing may preferably be performed at a draw ratio of 1.2 in at least a uniaxial direction.

(Process for Producing Separator of the Invention)

Hereinafter, a process for producing the separator of this invention having the ratio $d_{ave}/d_{max}$ of the average pore diameter $d_{ave}$ (µm) to the maximum pore diameter $d_{max}$ (µm) defined by ASTM F316-86 of 0.6 or more will be described.

A production process of the porous film constituting the separator of this invention is not limited so far as the method enables the porous film having the ratio $d_{ave}/d_{max}$ of 0.6 or more, and molded materials are not particularly limited. The separator of this invention is produced by a method similar to the conventional general separator production process described above, but, in order to achieve the ratio $d_{ave}/d_{max}$ of a separator to be produced of 0.6 or more, improvements such as [1] severe management of a particle size distribution of the filler, [2] control on conditions for mixing and drawing the resin and the filler, or a combination of [1] and [2] are implemented in this invention.

[1] Management of Particle Size Distribution of Filler: Control on Skewness of Number Average Particle Diameter Distribution of Filler In the present invention, the filler to be blended in the porous film may preferably have a skewness of 0.5 or more in its number average particle diameter distribution. A particle diameter distribution is evaluated by way of a laser diffraction and scattering method. The particle diameter distribution of the filler can also be measured by way of a state of the filler before being mixed to the resin or measured by pulverizing an ash content collected by burning the porous film. The skewness of the particle diameter distribution can be derived from the particle diameter distribution using a formula written on pages 194 to 19.5 of Tohkei Kohgaku Handbook, edited by Tokyo Kogyo University Tohkei Kohgaku Kenkyusho, for example. When the skewness of the particle diameter distribution is 0 or more, it is indicated that the particle diameter distribution is biased to a low particle diameter side. The bias to the low particle diameter side of the particle diameter distribution when the skewness is near 0 is insufficient for obtaining the porous film having the ratio $d_{ave}/d_{max}$ of 0.6 or more. The skewness of 0.5 or more is preferred for the purposes of reducing contribution of large particle diameter particles to creation of pores of a porous film to be obtained and obtaining the porous film having the ratio $d_{ave}/d_{max}$ of 0.6 or more. Also, when the skewness is less than 0, the particle diameter distribution is biased to a large particle diameter side to increase the contribution of large particle diameter particles and to make it difficult to obtain the porous film having the ratio $d_{ave}/d_{max}$ of 0.6 or more.

Therefore, the filler to be used in this invention may preferably have the skewness derived from the number average particle diameter distribution of the filler of 0.5 or more, more preferably 2 or more, still more preferably 2.5 or more.

In order to prepare the filler having the above particle size distribution, a particle diameter adjustment can be performed by using a classifier such as a sieve. The particle size adjustment can be performed for a plurality of times when so required.

[2] Controls on Mixing and Drawing Conditions of Resin and Filler

It is necessary to set mixing and stirring conditions that enable uniform dispersion of the filler in the thermoplastic resin. For example, a temperature and a time period included in melt-mixing conditions are strictly controlled.

Also, in the drawing operation, an appropriate temperature and an appropriate drawing speed must be set so as to uniformly draw the overall film. Drawing ununiformity is caused when the conditions are not appropriate to broaden a pore diameter distribution of pores to be formed, thereby making it difficult to obtain the porous film having the ratio $d_{ave}/d_{max}$ of 0.6 or more.

(Mode of Separator of the Invention—Contents of Impurities)

It is possible to improve a cyclability, particularly a cyclability at high temperatures, of the nonaqueous electrolyte solution secondary battery separator of this invention by keeping a content of halogen elements or chlorine elements to 10 ppm or less and a content of iron elements to 100 ppm or less.

Concentrations of the halogen element and the iron element contained in the separator can be determined by the following methods, and the methods (i) and (ii) were used for quantifying halogen elements and iron elements contained in a polymer porous film constituting a separator in Examples and Comparative Example described later in this specification.

(i) Quantification of Halogen Elements Contained in Separator 25 ml of pure water is added to 2 g of a sample (polymer porous film constituting a separator) to perform supersonic extraction for 15 minutes. For the supersonic extraction, a supersonic cleaner UT-104 SILENT SONIC, a product of Sharp Corporation, can be used (output is at a medium level). After that, the extract is filtrated to quantify halogen elements contained in the filtrate by ion chromatography.

(ii) Quantification of Iron Elements Contained in Separator 10 ml of 36% EL hydrochloric acid manufactured by Mitsubishi Chemical Co., Ltd. and 20 ml of pure water is added to 5 g of a sample (polymer porous film constituting a separator) to perform boiling extraction for 30 minutes. After that, the extract is filtrated to quantify Fe contained in the filtrate by using an ICP chemiluminescent detector.

An upper limit of the thus-measured content of halogen elements, particularly of chlorine elements, contained in the separator of this invention may preferably be 10 ppm or less, particularly 8 ppm or less, more particularly 5 ppm or less. When the content of halogen elements, particularly of chlorine elements, exceeds the upper limit, corrosions of a battery package and a current collector tend to be promoted by halogen elements such as Cl eluted into an electrolyte solution.

An upper limit of the thus-measured content of iron elements contained in the separator of this invention may preferably be 100 ppm or less, particularly 80 ppm or less, more particularly 70 ppm or less. When the content of iron elements exceeds the upper limit, Fe eluted in an electrolyte solution deposits on a surface of a negative electrode to form a minute short circuit, and the minute short circuit tends to be a cause of a reduction in charge-discharge efficiency and cyclability deterioration.

In view of a lower limit of each of the contents of halogen elements and iron elements in a separator, excessive reductions in contents of halogen elements and iron elements cause an increase in number of process steps since purification or the like of the inorganic filler must be performed for the purpose of reducing the contents of halogen elements and iron elements in the separator as described later in this specification and make it difficult to produce the polymer porous film. Since it is possible to ensure battery performance so far as the contents of halogen elements and iron elements are below the upper limit, the lower limit of the content of halogen elements, particularly of chlorine elements, in the separator may sufficiently be about 5 ppm, and the lower limit of the content of iron elements may sufficiently be about 50 ppm.

(Mode of Separator of the Invention—Adjustment of Contents of Impurities)

Hereinafter, a method for producing the separator of present invention when the content of halogen elements or chlorine elements is 10 ppm or less and the content of iron elements is 100 ppm or less is described.

The polymer porous film constituting the separator of this invention is produced by a method similar to that employed for forming the above-described general polymer porous film, and, in order to keep the content of halogen elements or chlorine elements in the separator to be obtained to 10 ppm or less and to keep the content of iron element in the separator to 100 ppm or less, impurities brought into the polymer porous film as being contained in the materials for the polymer porous film and impurities contaminate the polymer porous film during the manufacture process of the polymer porous film can be reduced by the following methods.

[1] Method Wherein Polymer Porous Film is Manufactured by Using Inorganic Filler Reduced in Contents of Halogen Elements and Iron Elements As described in the foregoing, since the inorganic filler is generally manufactured by using naturally quarried rocks as row materials, it is inevitably contaminated by impurities such as iron and halogen elements. For example, a concentration of iron is a several hundreds of parts per million, and a concentration of the halogen elements is a several tens of parts per million. Therefore, the commercially available filler may be subjected to processing such as purification and washing with water to reduce the impurities. Alternatively, by incorporating a chemical synthesis into a manufacture process of the inorganic filler, it is possible to reduce amounts of the impurities in the filler. In the case of incorporating the chemical synthesis, a synthesis wherein haloids are generated is not preferred since a large amount of halogen elements remains in an end product with due to synthesis.

In the case of washing with water the inorganic filler manufactured by using naturally quarried rocks as raw materials, it is possible to stir the filler in water having a temperature of about 20° C. to 100° C. In this case, an agent which does not contain halogen elements and iron elements such as sulfuric acid and nitric acid may be added to the water to increase an washing effect. A concentration of acid in the washing water may preferably be 1 to 20 wt %. In the case of using the water to which the agent is added, it is preferred to perform finishing wash using pure water.

As a method for purifying the inorganic filler manufactured by using the naturally quarried rocks as raw materials, a method of separating the pulverized rocks by differences in specific gravity in the air or water can be employed.

In the case of incorporating a chemical synthesis into a manufacture of a barium sulfate filler, the filler can be manufactured by reacting barium sulfate obtained by reducing and roasting barite which is the raw material rock with sodium sulfate or sulfuric acid. Also, in the case of manufacturing an alumina filler, the filler can be manufactured by adding sodium hydroxide to bauxite which is the row material rock to obtain sodium aluminate and then hydrolyzing the sodium aluminate to precipitate aluminum hydroxide, followed by baking the aluminum hydroxide at a high temperature.

By incorporating the washing with water, the purification, or the chemical synthesis into the manufacture of the filler, it is possible to reduce the contents of impurities, i.e. the content of halogen elements or chlorine elements and the content of iron elements, in a separator formed from a polymer porous film manufactured by using the thus-obtained filler to the above-specified upper limits or less.

Therefore, the contents of impurities in the inorganic filler differ depending on a content of the inorganic filler in the polymer porous film. Accordingly, the contents of impurities in the inorganic filler may relatively be large when the content of the filler is small, and it is recommended to minimize the contents of impurities in the inorganic filler when the content of the inorganic filler is large.

In this invention, the contents of impurities in the inorganic filler may preferably be reduced to the following concentrations. In the above-described content of the inorganic filler (usually 40 parts by weight or more, preferably 50 parts by weight, particularly 60 parts by weight, more preferably 100 parts by weight to 100 parts by weight of the thermoplastic resin, wherein the upper limit is usually 300 parts by weight or less, preferably 200 parts by weight or less, more preferably 150 parts by weight or less to 100 parts by weight of the thermoplastic resin), an upper limit of the content of halogen elements or chlorine elements may usually be 30 ppm or less, preferably 20 ppm or less, more preferably 15 ppm or less, and an upper limit of the content of iron elements may usually be 300 ppm or less, preferably 200 ppm or less, more preferably 100 ppm or less. From reasons which are similar to those described in the forgoing for the lower limit of the contents of impurities in the separator, a lower limit of the content of halogen elements or chlorine elements in the inorganic filler is about 7 ppm, and a lower limit of the content of iron elements in the inorganic filler is about 70 ppm.

The concentrations of halogen elements and iron elements in the inorganic filler can be determined by the following methods which are similar to those used for determining the impurity concentrations in the separator (polymer porous film), and the methods (iii) and (iv) are used for quantifying halogen elements and iron elements in inorganic fillers in Examples and Comparative Example described later in this specification.

(iii) Quantification of Halogen Elements in Inorganic Filler 25 ml of pure water is added to 2 g of a sample (inorganic filler) to perform supersonic extraction for 15 minutes. For the supersonic extraction, a supersonic cleaner UT-104 SILENT SONIC, a product of Sharp Corporation, can be used (output is at a medium level). After that, the extract is filtrated to quantify halogen elements contained in the filtrate by ion chromatography.

(iv) Quantification of Iron Elements in Inorganic Filler 10 ml of 36% EL hydrochloric acid manufactured by Mitsubishi Chemical Co., Ltd. and 20 ml of pure water are added to 5 g of a sample (inorganic filler) to perform boiling extraction for 30 minutes. After that, the extract is filtrated to quantify Fe contained in the filtrate by using an ICP chemiluminescent detector.

The contents of impurities in an inorganic filler contained in a separator can be measured in the same manner as described above. In this case, a matrix resin of a polymer porous film constituting the separator is burned at a high temperature, and the inorganic filler is collected from the thus-obtained ash to perform the above-described quantification.

[2] Method Wherein Resin Reduced in Contents of Halogen Elements and Iron Elements are Used as Base Resin of Polymer Porous Film An amount of about 4 to 5 ppm of chlorine elements derived from a catalyst can contaminate the thermoplastic resin used as a base resin of the polymer porous film during a polymerization reaction of the thermoplastic resin.

Therefore, the polymerization is performed by reducing the amount of the catalyst by way of an increase in catalyst activity, an increase in reaction period, an increase in reaction temperature, or the like during manufacture of the thermoplastic resin, so that the impurities derived from the catalyst are reduced by the reduction in amount of the catalyst remaining in the thermoplastic resin.

In the case of reducing the contents of impurities in the separator of this invention, either one of the impurity reduction methods [1] and [2] can be employed, and it is also possible to employ both of the methods to form the polymer porous film. However, since the halogen elements and the iron elements in the separator are derived primarily from the inorganic filler, it is preferred to employ the method [1] at least.

(Nonaqueous Electrolyte Solution Secondary Battery)

Hereinafter, the nonaqueous electrolyte solution secondary battery of this invention using the above-described nonaqueous electrolyte solution battery separator of this invention will be described. The nonaqueous electrolyte solution secondary battery has a positive electrode capable of inserting and extracting lithium ions, a negative electrode capable of inserting and extracting lithium ions, an electrolyte solution containing a nonaqueous solvent and an electrolyte contained in the nonaqueous solvent, and a separator.

As the nonaqueous solvent of the electrolyte solution used in the nonaqueous electrolyte solution secondary battery of this invention, known solvents for nonaqueous electrolyte solution secondary battery can be used. Examples of the nonaqueous solvent include alkylene carbonate such as ethylene carbonate, propylene carbonate, and butylene carbonate; dialkyl carbonate such as dimethyl carbonate, diethyl carbonate, di-n-propyl carbonate, and ethylmethyl carbonate (as the alkyl group of dialkyl carbonate, an alkyl group having 1 to 4 carbon atoms may preferably used); cyclic ether such as tetrahydrofurane and 2-methyltetrahydrofurane; chain ether such as dimethoxyethane and dimethoxymethane; cyclic carboxylic ester such as γ-butylolactone and γ-valerolactone; chain carboxylic ester such as methyl acetate, methyl propionate, and ethyl propionate; and the like. The above nonaqueous solvents may be used alone or in combination of 2 or more.

As a lithium salt used as a solute of the nonaqueous electrolyte solution, an arbitrarily selected lithium salt may be used. Examples of the lithium salt include an inorganic lithium salt such as $LiClO_4$, $LiPF_6$, and $LiBF_4$; a fluorine-containing organic lithium salt such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, and $LiBF_2(C_2F_5SO_2)_2$; and the like. Among the above lithium salts, $LiPF_6$, $LiBF_4$, $LiCF_3SO_3$, $LiN(CF_3SO_2)_2$, or $LiN(C_2F_5SO_2)_2$ may preferably used, and, $LiPF_6$ or $LiBF_4$ may particularly preferably be used. The above lithium salts may be used alone or in combination of 2 or more.

A lower limit of a concentration of the lithium salt in the nonaqueous electrolyte solution may usually be 0.5 mol/l or more, particularly 0.75 mol/l or more, and an upper limit of the concentration may usually be 2 mol/l or less, particularly 1.5 mol/l or less. When the concentration of the lithium salt exceeds the upper limit, a viscosity of the nonaqueous electrolyte solution is increased to reduce electroconductivity. When the concentration of the lithium salt is below the lower limit, the electroconductivity is reduced. Therefore, it is preferred to prepare the nonaqueous electrolyte solution in the above concentration range.

The nonaqueous electrolyte solution according to this invention may contain other useful ingredients, i.e., various additives such as conventional overcharge inhibitors, dehydrating agents, deoxidizing agents, and auxiliary agents for improving a storage property and a cyclability after storage at high temperatures.

Examples of the auxiliary agent for improving the storage property and the cyclability after storage at high temperatures include a carbonate compound such as vinylene carbonate, fluoroethylene carbonate, trifluoropropylene carbonate, phenylethylene carbonate, and erythritan carbonate; carboxylic acid anhydride such as succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, and phenylsuccinic anhydride; sulfur-containing compound such as ethylene sulfite, 1,3-propane sultone, 1,4-butane sultone, methyl methanesulfonate, busulfan, sulfolane, sulfolene, dimethylsulfone, and tetramethylthiuram monosulfide; a nitride-containing compound such as 1-methyl-2-pyrrolidinone, 1-methyl-2-piperidone, 3-methyl-2-oxazolidinone, 1,3-dimethyl-2-imidazolidinone, and N-methylsuccinimide; a hydrocarbon compound such as heptane, octane, and cycloheptane; and the like. When the auxiliary agent is contained in the nonaqueous electrolyte solution, a concentration thereof may usually be 0.1 to 5 wt %.

As the positive electrode, the one obtained by forming an active material layer containing a positive electrode active material and a binder on a current collector is ordinarily used.

Examples of the positive electrode active material include materials capable of inserting and extracting lithium, such as lithium cobalt oxide, lithium nickel oxide, lithium mangan oxide, and like lithium transition metal complex oxide materials. The positive electrode active materials can be used alone or in combination of 2 or more.

The binder is not particularly limited so far as the binder is a material stable against the solvent and the electrolyte solution which are used in the battery manufacture as well as against other materials used when running the battery. Specific examples of the binder include polyvinylidene fluoride, polytetrafluoroethylene, fluorinated polyvinylidene fluoride, an EPDM (ethylene-propylene-diene ternary copolymer), an SBR (styrene-butadiene rubber), an NBR (acrylonitrile-butadiene rubber), a fluorine rubber, polyvinyl acetate, polymethylmethacrylate, polyethylene, nitrocellulose, and the like. These binders can be used alone or in combination of plural types.

A proportion of the binder in the positive electrode active material layer is such that a lower limit thereof may usually be 0.1 wt % or more, preferably 1 wt % or more, more preferably 5 wt % or more and an upper limit thereof may usually be 80 wt % or less, preferably 60 wt % or less, more preferably 40 wt % or less, still more preferably 10 wt % or less. When the binder proportion is too small, the active material cannot be retained sufficiently, so that mechanical strength of the positive electrode becomes insufficient to deteriorate the battery performance such as the cyclability. When the binder proportion is too large, the battery capacity and the electroconductivity are reduced.

The positive electrode active material layer ordinarily contains an electroconductive agent in order to increase the electroconductivity. Examples of the electroconductive agent include graphite particles of natural graphite, artificial graphite, or the like; carbon black such as acetylene black; amorphous carbon particles such as needle coke; and like carbonaceous materials. The above electroconductive agents may be used alone or in combination of plural types. A proportion of the electroconductive agent in the positive electrode active material layer is such that a lower limit thereof may preferably be 0.01 wt % or more, preferably 0.1 wt % or more, more preferably 1 wt % or more and an upper limit thereof may usually be 50 wt % or less, preferably 30 wt % or less, more preferably 15 wt % or less. The electroconductivity can be insufficient when the electroconductive agent proportion is too small, and the battery capacity can be reduced when the electroconductive agent proportion is too large.

The positive electrode active material layer may contain an additive which is ordinarily used for an active material layer, such as a viscosity improver.

The viscosity improver is not particularly limited so far as it is stable against the solvent and the electrolyte solution used for the manufacture of the electrodes and other materials used when running the battery. Specific examples of the viscosity improver include carboxylmethylcellulose, methylcellulose, hydroxymethylcellulose, ethylcellulose, polyvinylalcohol, oxidized starch, phosphorylated starch, casein, and the like. These viscosity improvers may be used alone or in combination of plural types.

Aluminum, a stainless steel, a nickel-plated steel, and the like are used for the current collector of the positive electrode.

The positive electrode is formed by slurrying in a solvent the positive electrode active material, the binder, the electroconductive agent, and other additives which are added as required and then applying the slurry on the current collector followed by drying. The solvent used for the slurrying may usually be an organic solvent solving the binder. For example, N-methylpyrolidone, dimethylformamide, dimethylacetoamide, methylethylketone, cyclohexanone, methyl acetate, methyl acrylate, diethyltriamine, N—N-dimethylaminopropylamine, ethyleneoxide, tetrahydrofurane, or the like can be used as the solvent without limitation thereto. These solvents can be used alone or in combination of plural types. Also, it is possible to slurrying the active material by adding a dispersion, a viscosity improver, and the like to water and using a latex such as an SBR.

A thickness of the thus-obtained positive electrode active material layer may usually be about 10 to 200 μm. It is preferred to consolidate the active material layer obtained by the application and drying by roller pressing in order to increase a filling density of the active material.

As the negative electrode, the one obtained by forming an active material layer containing a negative electrode active material and a binder on a current collector is usually used.

As the negative electrode active material, a carbonaceous material capable of inserting and extracting lithium, such as thermally decomposed matter of an organic matter decomposed under various thermal decomposition conditions and artificial graphite and natural graphite; a metal oxide material capable of inserting and extracting lithium, such as tin oxide and silicon oxide; a lithium metal; various lithium alloys; and the like can be used. These negative electrode active materials can be used alone or in combination of 2 or more.

The binder is not particularly limited so far as the binder is a stable material against the solvent and the electrolyte solution which are used in the battery manufacture as well as against other materials used when running the battery. Specific examples of the binder include polyvinylidene fluoride, polytetrafluoroethylene, a styrene-butadiene rubber, an isoprene rubber, a butadiene rubber, and the like. These binders can be used alone or in combination of plural types.

A proportion of the binder in the negative electrode active material layer is such that a lower limit thereof may usually be 0.1 wt % or more, preferably 1 wt % or more, more preferably 5 wt % or more and an upper limit thereof may usually be 80 wt % or less, preferably 60 wt % or less, more preferably 40 wt % or less, still more preferably 10 wt % or less. When the binder proportion is too small, the active material cannot be retained sufficiently, so that mechanical strength of the negative electrode becomes insufficient to deteriorate the battery performance such as the cyclability. When the binder proportion is too large, the battery capacity and the electroconductivity are reduced.

The negative electrode active material layer ordinarily contains an electroconductive agent in order to increase the electroconductivity. Examples of the electroconductive agent include graphite particles of natural graphite, artificial graphite, or the like; carbon black such as acetylene black; amorphous carbon particles such as needle coke; and like carbonaceous materials. The above electroconductive agents may be used alone or in combination of plural types. A proportion of the electroconductive agent in the negative electrode active material layer is such that a lower limit thereof may usually be 0.01 wt % or more, preferably 0.1 wt % or more, more preferably 1 wt % or more and an upper limit thereof may usually be 50 wt % or less, preferably 30 wt % or less, more preferably 15 wt % or less. The electroconductivity can be insufficient when the electroconductive agent proportion is too small, and the battery capacity can be reduced when the electroconductive agent proportion is too large.

The negative electrode active material layer may contain an additive which is ordinarily used for an active material layer, such as a viscosity improver.

The viscosity improver is not particularly limited so far as it is stable against the solvent and the electrolyte solution used for the manufacture of the electrodes as well as to other materials used when running the battery. Specific examples of the viscosity improver include carboxylmethylcellulose, methylcellulose, hydroxymethylcellulose, ethylcellulose, polyvinylalcohol, oxidized starch, phosphorylated starch, casein, and the like. These viscosity improvers may be used alone or in combination of plural types.

Copper, nickel, a stainless steel, a nickel-plated steel, and the like are used for the current collector of the negative electrode.

The negative electrode is formed by slurrying in a solvent the negative electrode active material, the binder, the electroconductive agent, and other additives which are added as required and then applying the slurry on the current collector followed by drying.

The solvent used for the slurrying may usually be an organic solvent solving the binder. For example, N-methylpyrolidone, dimethylformamide, dimethylacetamide, methylethylketone, cyclohexanone, methyl acetate, methyl acrylate, diethyltriamine, N—N-dimethylaminopropylamine, ethyleneoxide, tetrahydrofurane, or the like can be used as the solvent without limitation thereto. These solvents can be used alone or in combination of plural types. Also, it is possible to slurrying the active material by adding a dispersion, a viscosity improver, and the like to water and using a latex such as an SBR.

A thickness of the thus-obtained negative electrode active material layer may usually be about 10 to 200 μm. It is preferred to consolidate the active material layer obtained by the application and drying by roller pressing in order to increase a filling density of the active material.

The lithium secondary battery of this invention is manufactured by assembling the positive electrode, the negative electrode, the nonaqueous electrolyte solution, and the separator of this invention in an appropriate form. Also, it is possible to use other elements such as an exterior case as required.

A form of the battery is not particularly limited, and it is possible to select one among the generally employed forms depending on a usage. Examples of the generally employed forms are a cylinder type wherein a sheet electrode and a separator are in the form of a spiral, an inside-out structure cylinder type wherein a pellet electrode and a separator are combined, a coin type wherein a pellet electrode and a separator are stacked, a laminate type wherein a sheet electrode and a separator are stacked, and the like. A method for assembling the battery is not particularly limited, too, and it is possible to select one among ordinarily used methods.

Though general embodiments of the lithium secondary battery of this invention are described in the foregoing, the lithium secondary battery of this invention is not limited to the above embodiments, and it is possible to put the lithium secondary battery into practical use with various modifications being added thereto as long as the modifications do not deviate from the scope of the invention.

Usage of the lithium secondary battery of this invention is not particularly limited, and it is possible to use the lithium secondary battery for various known applications. Specific examples of the applications include small size appliances such as a notebook type personal computer, a stylus-operated personal computer, a mobile personal computer, an electronic book player, a mobile phone, a mobile facsimile, a mobile photocopier, a mobile printer, a headphone stereo, a video movie, a liquid crystal television, a handy cleaner, a portable CD player, a minidisk player, a transceiver, an electronic organizer, a calculator, a memory card, a mobile tape recorder, a radio, a back-up power unit, a motor, a lighting equipment, a plaything, a game appliances, a watch, an electronic flash, and a camera, and large size appliances such as an electric car and a hybrid car.

EXAMPLES

Though this invention will hereinafter be described in more details using Examples and Comparative Example, this invention is not limited to Examples so far as Examples do not depart from this invention.

Note that an air permeability and a pore diameter of each of separators described later in this specification are evaluated as follows.

Air permeability: Measurements were conducted in accordance with JIS P8117 and by using B type Gurley densometer (product of Toyo Seiki Seisaku-Sho, Ltd.).

Pore diameter: Measurements were conducted by using a porometer produced by Beckman Coulter Inc. and in accordance with ASTM F316-86.

Example 1

Production of Porous Film

A resin composition obtained by blending 25.9 parts by weight of commercially available polypropylene 1 (homotype; FY6C—product of Japan Polychem Corporation; MFR: 2.4 g/10 min.), 6.5 parts by weight of polypropylene 2 (copolymer; INSPiRE—product of The Dow Chemical Company; MFR: 0.5 g/10 min), 2.6 parts by weight of hardened castor oil (HY-CASTOR OIL—product of Hokoku Corporation; molecular weight: 938), and 65 parts by weight of commercially available barium sulfate as a filler (number average particle diameter: 0.17 μm; skewness: 2.91) was melt-molded at 250° C. to obtain a sheet. A thickness of the whole cloth sheet was 50 μm, and the number of blended filler particles was that shown in Table 2.

The thus-obtained whole cloth sheet was drawn by 4.5 times at 80° C. in the sheet's longitudinal direction (MD) to obtain a porous film having a film thickness, a porosity, Gurley air permeability, and a pore diameter shown in Table 2.

Results of quantification of halogen (Cl) and Fe contained in the obtained porous film and barium sulfate used as the inorganic filler are shown in Table 2. The quantification was conducted in the manner described in the foregoing.

(Preparation of Electrolyte Solution)

Sufficiently dried $LiPF_6$ was dissolved into a mixture of ethylene carbonate and ethylmethyl carbonate (content ratio was 3:7) under a dried argon atmosphere to achieve a $LiPF_6$ proportion of 1.0 mol/litter, thereby obtaining an electrolyte solution.

(Production of Positive Electrode)

6 parts by weight of carbon black and 9 parts by weight of polyvinylidene fluoride (trade name: KF-1000; product of Kureha Chemical Industry Co., Ltd.) were mixed with 85 parts by weight of $LiCoO_2$ which was used as a positive electrode active material, and then the mixture was dispersed by using N-methyl-2-pyrolidone to obtain a slurry. The slurry was applied uniformly on one side of an aluminum foil having a thickness of 20 μm serving as a positive electrode current collector and then dried, followed by pressing by a presser to obtain a positive electrode whose positive electrode active material layer had a density of 1.9 $g/cm^3$.

(Production of Negative Electrode)

6 parts by weight of polyvinylidene fluoride was mixed with 94 parts by weight of natural graphite powder which was used as a negative electrode active material, and then the mixture was dispersed by using N-methyl-2-pyrolidone to obtain a slurry. The slurry was applied uniformly on one side of a copper foil having a thickness of 18 μm serving as a negative electrode current collector and then dried, followed by pressing by a presser to obtain a negative electrode whose negative electrode active material layer had a density of 1.3 $g/cm^3$.

(Assembly of Battery)

A 2032 type coin cell was formed from the porous film, the electrolyte solution, the positive electrode, and the negative electrode obtained above, wherein the porous film was used as a separator. More specifically, the positive electrode which was obtained by punching in the form of a disk having a diameter of 12.5 mm and impregnated with the electrolyte solution was housed in a stainless steel can which was used also as a positive electrode electrical conductor, and the negative electrode which was obtained by punching in the form of a disk having a diameter of 12.5 mm and impregnated with the electrolyte solution was placed on the positive electrode via the separator having a diameter of 18.8 mm impregnated with the electrolyte solution. The can was caulked with a sealing plate serving also as a negative electrode electrical conductor via a gasket for insulating and then tightly sealed to obtain a coin type battery. The impregnation of the battery components with the electrolyte solution was performed for 2 minutes.

(Evaluation 1 of Battery)

After performing initial charge and discharge of the produced coin type battery, discharge capacities at discharge speeds of C/3, 4C, and 6C were measured (a current at which it takes one hour for discharging a rated capacity according to a discharge capacity with a one hour rate is 1C, and this applies to the following evaluations), and percentages of the discharge capacities based on the discharge capacity at C/3 were obtained. Results are shown in Table 2.

(Evaluation 2 of Battery)

Charging and discharging at 25° C. at a constant current corresponding to 0.2C (a current at which it takes one hour for discharging a rated capacity according to a discharge capacity with a one hour rate is 1C, and this applies to the following evaluations) at a charge termination voltage of 4.2 V and at a discharge termination voltage of 3 V were repeated for three cycles to stabilize the battery. In the fourth cycle, the battery was charged at a current corresponding to 0.5C to a charge termination voltage of 4.2 V, and 4.2 V—constant current constant voltage charging (CCCV charging) (0.05C cut) was continued until a charge current value reaches a current value corresponding to 0.05C, followed by a 3V discharge at a constant current value corresponding to 0.2C.

Further, charging and discharging at 60° C. at a constant current corresponding a charge/discharge current value of 2C at a charge termination voltage of 4.2 V and at a discharge termination voltage of 3 V was repeated for 100 cycles. Changes in discharge capacity at the cycles were examined, and results are shown in Table 2.

Example 2

A porous film having physical properties shown in Table 2 was obtained in the same manner as in Example 1 except for using 30.8 parts by weight of the polypropylene 1, 1.6 parts by weight of the polypropylene 2, 2.6 parts by weight of the hardened castor oil, and 65 parts by weight of the barium sulfate (number average pore diameter: 0.17 μm, skewness: 2.91) and drawing the whole cloth sheet in the sheet's longitudinal direction (MD) by 3.5 times.

A coin type battery was assembled in the same manner as in Example 1 except for using this porous film as a separator, and evaluation thereof was conducted in the same manner. Results of the evaluation are shown in Table 2.

Quantification of halogen (Cl) and Fe contained in the obtained porous film and the barium sulfate used as the inorganic filler were conducted in accordance with the quantification method described in the foregoing, and results of the quantification are shown in Table 2.

Example 3

A resin composition was obtained by using 46.3 parts by weight of the commercially available polypropylene 1 used in Example 1, 3.7 parts by weight of the hardened castor oil used in Example 1, and 50 parts by weight of commercially available barium sulfate (number average pore diameter: 0.18 μm, skewness: 3.57) as a filler, and then the resin composition was melt-molded at 250° C. to obtain a whole cloth sheet having an average thickness of 180 μm and the number of blended filler particles shown in Table 2. The obtained whole cloth sheet was drawn at 70° C. in the sheet's longitudinal direction (MD) by 4.5 times, followed by drawing at 120° C. in the sheet's width direction (TD) by 4.4 times to obtain a porous film having physical properties shown in Table 2.

Quantification of halogen (Cl) and Fe contained in the obtained porous film and the barium sulfate used as the inorganic filler were conducted in accordance with the quantification method described in the foregoing, and results of the quantification are shown in Table 2.

A coin type battery was assembled in the same manner as in Example 1 except for using this porous film as a separator, and evaluation thereof was conducted in the same manner. Results of the evaluation are shown in Table 2.

Example 4

A resin composition was obtained by using 46.3 parts by weight of the commercially available polypropylene 1 used in Example 1, 3.7 parts by weight of the hardened castor oil used in Example 1, and 50 parts by weight of commercially available barium sulfate (number average pore diameter: 0.46 μm, skewness: 1.15) as a filler, and then the resin composition was melt-molded at 250° C. to obtain a whole cloth sheet having an average thickness of 170 μm and the number of blended filler particles shown in Table 2. The obtained whole cloth sheet was drawn at 70° C. in the sheet's longitudinal direction (MD) by 4.0 times, followed by drawing at 120° C. in the sheet's width direction (TD) by 3.5 times to obtain a porous film having physical properties shown in Table 2.

Quantification of halogen (Cl) and Fe contained in the obtained porous film and the barium sulfate used as the inorganic filler were conducted in accordance with the quantification method described in the foregoing, and results of the quantification are shown in Table 2.

A coin type battery was assembled in the same manner as in Example 1 except for using this porous film as a separator, and evaluation thereof was conducted in the same manner. Results of the evaluation are shown in Table 2.

Comparative Example 1

A resin composition was obtained by using 46.3 parts by weight of the commercially available polypropylene 1 used in Example 1, 3.7 parts by weight of the hardened castor oil used in Example 1, and 50 parts by weight of commercially available barium sulfate (number average pore diameter: 1.07 μm, skewness: −0.67) as a filler, and then the resin composition was melt-molded at 250° C. to obtain a whole cloth sheet having an average thickness of 180 μm and the number of blended filler particles shown in Table 2. The obtained whole cloth sheet was drawn at 70° C. in the sheet's longitudinal direction (MD) by 3.5 times, followed by drawing at 120° C. in the sheet's width direction (TD) by 3.0 times to obtain a porous film having physical properties shown in Table 2.

Quantification of halogen (Cl) and Fe contained in the obtained porous film and the barium sulfate used as the inorganic filler were conducted in accordance with the quantification method described in the foregoing, and results of the quantification are shown in Table 2.

A coin type battery was assembled in the same manner as in Example 1 except for using this porous film as a separator, and evaluation thereof was conducted in the same manner. Results of the evaluation are shown in Table 2.

TABLE 2

| Examples. | Filler Number Average Particle Diameter (μm) | Skewness | Whole Cloth Sheet Number of Blended Filler Particles (number/cm³) | Separator (Porous Film) Thickness (μm) | Porosity (%) | Air permeability (sec./100 cc) | Average Pore Diameter dave (μm) | Maximum Pore Diameter dmax (μm) | dave/dmax |
|---|---|---|---|---|---|---|---|---|---|
| Example 1 | 0.17 | 2.91 | $5 \times 10^{13}$ | 22 | 53 | 220 | 0.134 | 0.178 | 0.75 |
| Example 2 | 0.17 | 2.91 | $5 \times 10^{13}$ | 26 | 47 | 390 | 0.111 | 0.167 | 0.66 |
| Example 3 | 0.18 | 3.57 | $2 \times 10^{13}$ | 27 | 67 | 170 | 0.101 | 0.150 | 0.67 |
| Example 4 | 0.46 | 1.15 | $8 \times 10^{11}$ | 29 | 61 | 210 | 0.212 | 0.341 | 0.62 |
| Comparative Example 1 | 1.07 | −0.67 | $3 \times 10^{11}$ | 30 | 41 | 620 | 0.626 | 1.182 | 0.53 |
| Example 5 | 0.40 | 1.8 | $6 \times 10^{12}$ | 25 | 60 | 110 | 0.185 | 0.291 | 0.64 |
| Example 6 | 0.48 | 14.1 | $5 \times 10^{11}$ | 30 | 68 | 50 | 0.241 | 0.332 | 0.73 |
| Example 7 | 0.46 | 15.1 | $5 \times 10^{11}$ | 34 | 67 | 40 | 0.238 | 0.325 | 0.73 |
| Example 8 | 0.42 | 3.2 | $5 \times 10^{13}$ | 22 | 62 | 100 | 0.188 | 0.266 | 0.71 |
| Example 9 | 0.46 | 15.1 | $5 \times 10^{11}$ | 33 | 66 | 40 | 0.240 | 0.322 | 0.75 |

| Examples | Percentage of Discharge Capacity to Discharge Capacity at C/3 (%) | | Concentration in Porous Film (ppm) | | Concentration in Inorganic Filler (ppm) | | Discharge Capacity Ratio (%) Number of Cycles | | |
|---|---|---|---|---|---|---|---|---|---|
| | 4C | 6C | Fe | Cl | Fe | Cl | 1 | 50 | 100 |
| Example 1 | 75 | 65 | 1.3 | 1 | 2 | 2 | 100 | 83 | 74 |
| Example 2 | 68 | 60 | 1.3 | 1 | 2 | 2 | 100 | 81 | 70 |
| Example 3 | 84 | 70 | 2.1 | 1 | 2 | 2 | 100 | 86 | 75 |
| Example 4 | 76 | 65 | <0.5 | 34 | <0.5 | 55 | 100 | 77 | 61 |
| Comparative Example 1 | 48 | 37 | <0.5 | 32 | <0.5 | 52 | 100 | 75 | 58 |
| Example 5 | 79 | 68 | 1.3 | 0.6 | 2.4 | 1 | 100 | 89 | 82 |
| Example 6 | 83 | 72 | 7.3 | 2 | 12 | 3 | 100 | 84 | 76 |
| Example 7 | 83 | 72 | 1.5 | 0.6 | 3 | 1 | 100 | 90 | 82 |
| Example 8 | 84 | 71 | <0.5 | 34 | <0.5 | 54 | 100 | 78 | 60 |
| Example 9 | 83 | 72 | 370 | 26 | 580 | 40 | 100 | 73 | 50 |

As is apparent from Table 2, the discharge capacities of the coin type batteries wherein the porous films obtained in Example 1 to 4 are used as the separators are good, namely, 60% or more of C/3 at the discharge speeds of 4C and 6C. In contrast, the discharge capacities at the discharge speeds of 4C and 6C of the coin type battery wherein the porous film of Comparative Example 1 was used as the separator were below 50% of C/3 to reveal deterioration in battery performance.

More specifically, commercially available barium sulfates vary in physical properties, and it is impossible to achieve the specific ratio $d_{ave}/d_{max}$ of this invention by using the fillers arbitrarily. However, it is possible to improve the battery property by controlling the physical properties.

Also, it is revealed from comparison between Examples 1 to 3 and Example 4 that it is possible to further improve the cyclability at high temperatures by controlling the contents of specific impurities, namely of halogen element, particularly of chlorine elements and iron elements.

Example 5

Production of Polymer Porous Film

A resin composition was obtained by melt-mixing 100 parts by weight of high density polyethylene (HI-ZEX7000FP—product of Mitsui Chemical Co., Ltd.; weight average molecular weight: 200,000; density: 0.956 g/cm³; melt flow rate: 0.04 g/10 min), 15.6 parts by weight of soft polypropylene (PER R110E—product of Idemitsu Petrochemical Co., Ltd.; weight average molecular weight: 330,000), 9.4 parts by weight of hardened castor oil (HY-CASTOR OIL—product of Hokoku Corporation; molecular weight: 938), and 187.5 parts by weight of barium sulfate as an inorganic filler (B-55—product of Sakai Chemical Industry Co., Ltd.; volume average particle diameter: 0.66 μm; number average pore diameter: 0.40 μm; skewness: 1.8), and the obtained resin composition was inflation molded at 210° C. to obtain a whole cloth sheet. An average thickness of the whole cloth sheet was 105 μm, and the number of blended filler particles was as shown in Table 2. The obtained whole cloth sheet was drawn at 70° C. in the sheet's longitudinal direction (MD) by 1.31 times and then at 110° C. in the sheet's width direction (TD) by 2.95 times to obtain a polymer porous film having a film thickness of 25 μm, a porosity of 60%, and a Gurley air permeability of 110 second/100 cc.

Quantification of halogen (Cl) and Fe contained in the obtained polymer porous film and the barium sulfate used as the inorganic filler was conducted in accordance with the quantification method described in the foregoing, and results of the quantification, the number of blended filler particles, the film thickness, the porosity, the Gurley air permeability, and the pore diameter are as shown in Table 2.

(Preparation of Electrolyte Solution)

Sufficiently dried $LiPF_6$ was dissolved into a mixture (content ratio: 3:7) of ethylene carbonate and ethylmethyl carbonate under a dried argon atmosphere to achieve a $LiPF_6$ proportion of 1.0 mol/litter, thereby obtaining an electrolyte solution.

(Production of Positive Electrode)

6 parts by weight of carbon black and 9 parts by weight of polyvinylidene fluoride (trade name: KF-1000, product of Kureha Chemical Industry Co., Ltd.) were mixed with 85 parts by weight of $LiCoO_2$ which was used as a positive electrode active material, and then the mixture was dispersed by using N-methyl-2-pyrolidone to obtain a slurry. The slurry was applied uniformly on one side of an aluminum foil having a thickness of 20 μm serving as a positive electrode current collector and then dried, followed by pressing by a presser to obtain a positive electrode whose positive electrode active material layer had a density of 3.0 g/cm³.

(Production of Negative Electrode)

6 parts by weight of polyvinylidene fluoride was mixed with 94 parts by weight of natural graphite powder which was used as a negative electrode active material, and then the mixture was dispersed by using N-methyl-2-pyrrolidone to obtain a slurry. The slurry was applied uniformly on one side of a copper foil having a thickness of 18 μm serving as a negative electrode current collector and then dried, followed by pressing by a presser to obtain a negative electrode whose negative electrode active material layer had a density of 1.5 g/cm³.

(Assembly of Battery)

A 2032 type coin cell was formed from the polymer porous film, the electrolyte solution, the positive electrode, and the negative electrode obtained above, wherein the polymer porous film was used as a separator. More specifically, the positive electrode which was obtained by punching in the form of a disk having a diameter of 12.5 mm and impregnated with the electrolyte solution was housed in a stainless steel can which was used also as a positive electrode electrical conductor, and the negative electrode which was obtained by punching in the form of a disk having a diameter of 12.5 mm and impregnated with the electrolyte solution was placed on the positive electrode via the separator having a diameter of 18.8 mm impregnated with the electrolyte solution. The can was caulked with a sealing plate serving also as a negative electrode electrical conductor via a gasket for insulating and then tightly sealed to obtain a coin type battery. The impregnation of the battery components with the electrolyte solution was performed for 2 minutes.

(Evaluation 1 of Battery)

After performing initial charge and discharge of the produced coin type battery, discharge capacities at discharge speeds of C/3, 4C, and 6C were measured (a current at which it takes one hour for discharging a rated capacity according to a discharge capacity with a one hour rate is 1C, and this applies to the following evaluations), and percentages of the discharge capacities based on the discharge capacity at C/3 were obtained. Results are shown in Table 2.

(Evaluation 2 of Battery)

Charging and discharging at 25° C. at a constant current corresponding to 0.2C (a current at which it takes one hour for discharging a rated capacity according to a discharge capacity with a one hour rate is 1C, and this applies to the following evaluations) at a charge termination voltage of 4.2 V and at a discharge termination voltage of 3 V were repeated for three cycles to stabilize the battery. In the fourth cycle, the battery was charged at a current corresponding to 0.5C to a charge termination voltage of 4.2 V, and 4.2 V—constant current constant voltage charging (CCCV charging) (0.05C cut) was continued until a charge current value reaches a current value corresponding to 0.05C, followed by a 3V discharge at a constant current value corresponding to 0.2C. Further, charging and discharging at 60° C. at a constant current corresponding a charge/discharge current value of 2C at a charge termination voltage of 4.2 V and at a discharge termination voltage of 3 V was repeated for 100 cycles. Changes in discharge capacity at the cycles were studied, and results are shown in Table 2.

Example 6

A polymer porous film having a film thickness of 30 μm, a porosity of 68%, a Gurley air permeability of 50 seconds/100 cc was obtained in the same manner as in Example 1 except for using barium sulfate (BA—product of Sakai Chemical Industry Co., Ltd.; volume average pore diameter: 8 μm; number average pore diameter: 0.48 μm; skewness: 14.1). Quantification of halogen (Cl) and Fe contained in the obtained polymer porous film and the barium sulfate used as the inorganic filler were conducted in accordance with the quantification method described in the foregoing, and results of the quantification, the number of blended filler particles, the film thickness, the porosity, the Gurley air permeability, and the pore diameter were as shown in Table 2.

A coin type battery was assembled in the same manner as in Example 5 except for using this polymer porous film as a separator, and evaluation thereof was conducted in the same manner. Results of the evaluation are shown in Table 3.

Example 7

Barium sulfate (BC—product of Sakai Chemical Industry, Co., Ltd.; volume average pore diameter: 10 μm, number average pore diameter: 0.46 μm; skewness: 15.1) was extracted with 5 wt % sulfate for one hour and then filtrated followed by washing with pure water. The washed filtrate was subjected to supersonic extraction and then filtrated followed by washing with pure water. The washed barium sulfate was dried at 120° C. for one hour and then vacuum dried at 120° C. for 12 hours. A polymer porous film having a film thickness of 34 μm, a porosity of 67%, a Gurley air permeability of 40 seconds/100 cc was obtained in the same manner as in Example 1 except for using the barium sulfate underwent the above described treatments as an inorganic filler. Quantification of halogen (Cl) and Fe contained in the obtained polymer porous film and the barium sulfate used as the inorganic filler was conducted in accordance with the quantification method described in the foregoing, and results of the quantification, the number of blended filler particles, the film thickness, the porosity, the Gurley air permeability, and the pore diameter were as shown in Table 2.

A coin type battery was assembled in the same manner as in Example 5 except for using this polymer porous film as a separator, and evaluation thereof was conducted in the same manner. Results of the evaluation are shown in Table 2.

Example 8

A polymer porous film having a film thickness of 22 μm, a porosity of 62%, a Gurley air permeability of 100 seconds/100 cc was obtained in the same manner as in Example 1 except for using barium sulfate (B-1—product of Sakai Chemical Industry, Co., Ltd.; volume average pore diameter: 0.8 μm, number average pore diameter: 0.42 μm; skewness: 3.2) as an inorganic filler. Quantification of halogen (Cl) and Fe contained in the obtained polymer porous film and the barium sulfate used as the inorganic filler were conducted in accordance with the quantification method described in the foregoing, and results of the quantification, the number of blended filler particles, the film thickness, the porosity, the Gurley air permeability, and the pore diameter were as shown in Table 2.

A coin type battery was assembled in the same manner as in Example 5 except for using this polymer porous film as a separator, and evaluation thereof was conducted in the same manner. Results of the evaluation are shown in Table 2.

Example 9

A polymer porous film having a film thickness of 33 μm, a porosity of 66%, a Gurley air permeability of 40 seconds/100 cc was obtained in the same manner as in Example 1 except for using barium sulfate (BC—product of Sakai Chemical Industry, Co., Ltd.; volume average pore diameter: 10 μm, number average pore diameter: 0.46 μm; skewness: 15.1) as an inorganic filler. Quantification of halogen (Cl) and Fe contained in the obtained polymer porous film and the barium sulfate used as the inorganic filler was conducted in accordance with the quantification method described in the foregoing, and results of the quantification, the number of blended filler particles, the film thickness, the porosity, the Gurley air permeability, and the pore diameter were as shown in Table 2.

A coin type battery was assembled in the same manner as in Example 5 except for using this polymer porous film as a separator, and evaluation thereof was conducted in the same manner. Results of the evaluation are shown in Table 2.

As is apparent from Table 2, the discharge capacities of the coin type batteries wherein the porous films obtained in Example 5 to 9 are used as the separators are good, namely, 68% or more of C/3 at the discharge speeds of 4C and 6C.

Also, it is revealed from comparison between Examples 5 to 7 and Examples 8 and 9 that it is possible to further improve the cyclability at high temperatures by controlling the contents of specific impurities, namely of halogen element, particularly of chlorine elements and iron elements.

In general, a halogen ion dissolves passivity of a surface of a metal to change metal oxide into metal halide. Corrosion is advanced by the metal halide since the metal halide is easily dissolved. Accordingly, as can be seen in the results of chloride ion, it is considered that corrosion of the can and the current collector is advanced when a halogen concentration is high to deteriorate the battery performance such as the cyclability.

Hence, from the results of Examples 1 to 3 and the results of Examples 5 to 7, it is considered that the effect of this invention is achieved by controlling the overall halogen elements.

This invention has been described in detail using the specific modes in the foregoing, and it is apparent to those skilled in the art that various alterations and modifications can be made so far as the alterations and the modifications do not depart from the spirit and the scope of this invention.

In addition, this patent application is based on Japanese patent application (JP-A-2003-287903) filed on Aug. 6, 2003 and Japanese patent application (JP-A-2003-287904) filed on Aug. 6, 2003, and contents thereof are incorporated herein by reference.

INDUSTRIAL APPLICABILITY

This invention is useful for improving performance of nonaqueous electrolyte solution secondary battery, particularly a rate capability and a stability of the battery.

The invention claimed is:

1. A nonaqueous electrolyte solution secondary battery separator, which comprises a porous film containing a filler in a thermoplastic resin, wherein a ratio $d_{ave}/d_{max}$ of an average pore diameter $d_{ave}$ (μm) to a maximum pore diameter $d_{max}$ (μm) 0.73 or higher.

2. The nonaqueous electrolyte solution secondary battery separator according to claim 1, wherein the average pore diameter $d_{ave}$ is 0.03 to 5 μm.

3. The nonaqueous electrolyte solution secondary battery separator according to claim 1, wherein a porosity is 30% to 70%.

4. The nonaqueous electrolyte solution secondary battery separator according to claim 1, wherein a content of the filler is 40 parts by weight or more and 300 parts by weight or less to 100 parts by weight of the thermoplastic resin.

5. The nonaqueous electrolyte solution secondary battery separator according to claim 1, wherein the thermoplastic resin is selected from the group consisting of a polyolefin resin, a fluorine resin, a styrene-based resin, an ABS resin, a vinyl chloride resin, a vinyl acetate resin, an acryl resin, a polyamide resin, an acetal resin, and a polycarbonate resin.

6. The nonaqueous electrolyte solution secondary battery separator according to claim 1, wherein the thermoplastic resin is selected from the group consisting of high density polyethylene and polypropylene.

7. The nonaqueous electrolyte solution secondary battery separator according to claim 1, wherein the thermoplastic resin has a weight average molecular weight of 500,000 or less.

8. The nonaqueous electrolyte solution secondary battery separator according to claim 1, wherein the filler has a number average particle diameter of 0.01 to 2 μm and a skewness of 0.5 or more.

9. The nonaqueous electrolyte solution secondary battery separator according to claim 1, wherein, when an electrolyte solution comprises a mixed nonaqueous solvent solution which is obtained by dissolving LiPF6 into a mixed nonaqueous solution containing ethylene carbonate and ethylmethyl carbonate in a volumetric ratio of 3:7 and contains LiPF6 at a concentration of 1 M, the filler achieves a lithium ion concentration of more than 0.75 mmol/g in the electrolyte solution after adding the filler thereto at a ratio of 0.5 g to 1 ml of the electrolyte solution and then retaining the electrolyte solution at 85° C. for 72 hours.

10. The nonaqueous electrolyte solution secondary battery separator according to claim 1, wherein the filler is selected from the group consisting of barium sulfate and alumina.

11. The nonaqueous electrolyte solution secondary battery separator according to claim 1, wherein the number of blended filler particles is $1 \times 10^{11}$/cm$^3$ or more.

12. The nonaqueous electrolyte solution secondary battery separator according to claim 1, wherein the filler is treated with a surface treatment agent selected from the group consisting of aliphatic acid or a metal salt thereof, polysiloxane, and a silane coupling agent.

13. The nonaqueous electrolyte solution secondary battery separator according to claim 1, wherein the thermoplastic resin contains 20 parts by weight or less of a low molecular compound having a molecular weight of 200 or more and 3,000 or less to 100 parts by weight of the thermoplastic resin.

14. The nonaqueous electrolyte solution secondary battery separator according to claim 1, wherein a Gurley air permeability of the separator is 20 seconds/100 cc or more and 500 seconds/100 cc or less.

15. The nonaqueous electrolyte solution secondary battery separator according to claim 1, wherein a concentration of halogen element contained in the separator is 10 ppm or less and a concentration of iron element contained in the separator is 100 ppm or less.

16. The nonaqueous electrolyte solution secondary battery separator according to claim 1, wherein a concentration of chlorine element contained in the separator is 10 ppm or less.

17. A nonaqueous electrolyte solution secondary battery, which comprises a positive electrode capable of inserting and extracting lithium ions, a negative electrode capable of inserting and extracting lithium ions, an electrolyte solution containing an electrolyte in a nonaqueous solvent, and a separator, characterized by using as the separator the separator defined in claim 1.

18. The nonaqueous electrolyte solution secondary battery according to claim 17, wherein the nonaqueous solvent contained in the electrolyte solution is selected from the group consisting of alkylene carbonate, dialkyl carbonate, cyclic ether, chain ether, cyclic carboxylic ester, and chain carboxylic ester.

19. The nonaqueous electrolyte solution secondary battery according to claim 17, wherein lithium transition metal complex oxide is used as an active material of the positive electrode.

20. The nonaqueous electrolyte solution secondary battery according to claim 17, wherein an active material of the negative electrode is selected from the group consisting of a carbonaceous material, a metal oxide material, a lithium metal, and a lithium alloy.

21. The nonaqueous electrolyte solution secondary battery according to claim 17, wherein a discharge capacity at a discharge speed of 6C to a discharge capacity at a discharge speed C/3 is 60% or more.

22. The nonaqueous electrolyte solution secondary battery separator according to claim 1, wherein the ratio $d_{ave}/d_{max}$ is in a range from 0.73-0.75.

* * * * *